United States Patent [19]

Nishida et al.

[11] Patent Number: 4,803,735
[45] Date of Patent: Feb. 7, 1989

[54] METHOD AND APPARATUS FOR CALCULATING POSITION AND ORIENTATION BY COMBINATION OF FEATURES OF PARTIAL SHAPES

[75] Inventors: Yoshie Nishida, Yokohama; Seiji Hata, Fujisawa; Masao Tsuji, Funabashi, all of Japan

[73] Assignee: Hitachi, Ltd., Tokyo, Japan

[21] Appl. No.: 917,053

[22] Filed: Oct. 9, 1986

[30] Foreign Application Priority Data

Oct. 11, 1985 [JP] Japan ............................ 60-224857

[51] Int. Cl.⁴ .............................................. G06K 9/32
[52] U.S. Cl. ........................................ 382/8; 382/45; 382/48
[58] Field of Search .................... 382/8, 34, 48, 45

[56] References Cited

U.S. PATENT DOCUMENTS

| | | | |
|---|---|---|---|
| 4,334,241 | 6/1982 | Kashioka | 382/45 |
| 4,435,837 | 3/1984 | Abernathy | 382/45 |
| 4,566,126 | 1/1986 | Miyagawa | 382/48 |
| 4,611,292 | 9/1986 | Ninomiya | 382/48 |
| 4,630,225 | 12/1986 | Hisano | 382/8 |

Primary Examiner—Leo H. Boudreau
Attorney, Agent, or Firm—Fay, Sharpe, Beall, Fagan, Minnich & McKee

[57] ABSTRACT

There are disclosed a method and an apparatus for properly recognizing the position and orientation of a whole object article from its partial shape. The method comprises the steps of first extracting an image of a partial shape from a two-dimensional picture image representing at least one portion of the object article whose position and orientation are to be recognized, then calculating at least one of a center of gravity, an intersection of straight lines and a linear equation with respect to each of the extracted feature shapes, thereby obtaining at least one feature parameter, and calculating the position and orientation of the whole object article by arbitrarily combining such feature parameters.

9 Claims, 7 Drawing Sheets

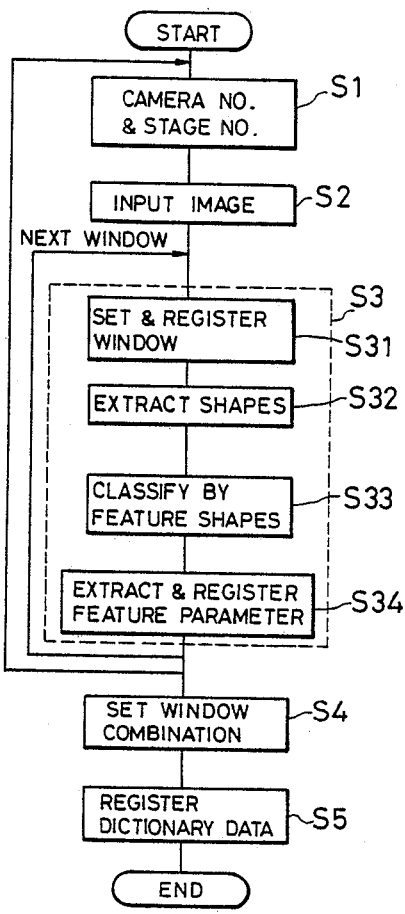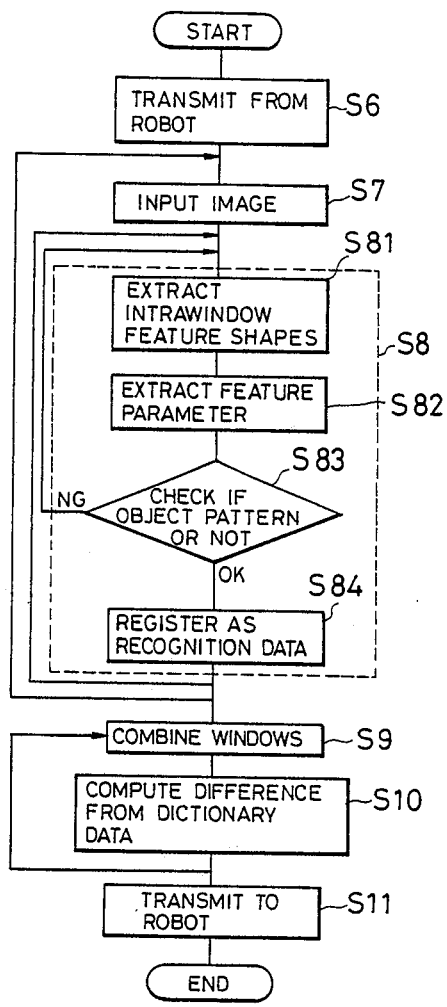

FIG. 9
| FEATURE PATTERN | EXTRACTED FEATURE PARAMETER |
|---|---|
| ① 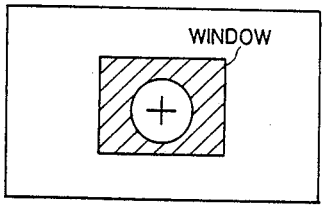 | ○ CENTER OF GRAVITY |
| ② 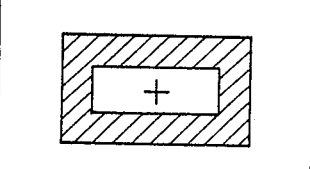 | ○ CENTER OF GRAVITY<br>○ MAJOR AXIS / MINOR AXIS |
| ③ 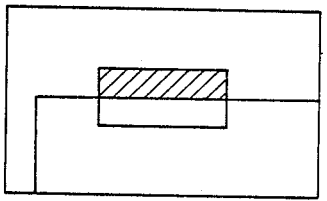 | ○ LINEAR EQUATION |
| ④ 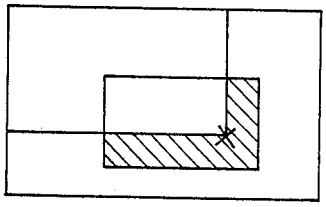 | ○ LINEAR EQUATION<br>○ INTERSECTION OF TWO STRAIGHT LINES |

FIG. 10

| | CENTER OF GRAVITY | CENTER OF GRAVITY / SECONDARY MOMENT | LINEAR EQUATION | INTERSECTION OF TWO STRAIGHT LINES |
|---|---|---|---|---|
| | | | | |
| | | | | |
| | | | | |
| | | | | |
| | | | | |

METHOD AND APPARATUS FOR CALCULATING POSITION AND ORIENTATION BY COMBINATION OF FEATURES OF PARTIAL SHAPES

BACKGROUND OF THE INVENTION

1. Field of the Invention:

The present invention relates to a method and an apparatus for image recognition to calculate the position and orientation of an object article and, more particularly, to a method and an apparatus for calculating the position and orientation of a whole object article inclusive of its partial shapes by comptuing the linear equations, centers of gravity and so forth of such partial shapes.

2. Description of the Prior Art:

In the part recognition technology developed heretofore, there is known an exemplary pattern recognition apparatus disclosed in Japanese Patent Laid-open No. 59 (1984)-154574 (Patent Application No. 58 (1983)-27518, U.S. Patent Ser. No. 582,555). According to this prior art, the pattern of an object article is recognized by first detecting the entire contour thereof and, after calculating its feature parameters such as center of gravity, principal axis and so forth, finding the degree of coincidence between the pattern of the object article and a selected dictionary pattern in a state where the two patterns are so set that the respective principal axes coincide with each other. However, in case the object article to be recognized is a printed circuit board or the like with electronic components mounted thereon and its image is extremely complicated or its external dimensions are large, there exist some disadvantages including that a distinct image of the whole object article cannot be obtained immediately or its shape cannot be obtained simultaneously. Consequently, fast calculation of feature parameters is not attainable with facility to substantially fail in proper recognition of the object article in practical operation.

Meanwhile, in Japanese Patent Laid-open No. 58 (1983)-62503, there is disclosed an invention which executes controlled positioning of a member on the basis of its area in a window set in a part of the image. However, since the positioning in the above example is performed merely using the area parameter, a precise position is not achievable.

Generally it has been customary in the prior art to place an object article under positive control so that its predetermined reference position and orientation are retained. When the position and orientation are properly recognized, the correlation between them and the reference ones is defined uniquely so that the object article can be controlled properly by correcting the reference position and orientation in accordance with such correlation. That is, proper control of the object article is sufficiently attainable by proper recognition of the current position and orientation.

SUMMARY OF THE INVENTION

It is an object of the present invention to provide a method and an apparatus adapted for calculating the position and orientation of an object article properly not from its entire shape but from its partial feature shapes.

And another object of the invention resides in providing a method and an apparatus capable of extracting the position and orientation of a whole object article with simplicity and rapidity even when the object article is dimensionally large or its image is complicated.

In order to accomplish the objects mentioned above, the present invention is so contrived as to calculate the current position and orientation of the object article on the basis of two given points, or one given point and one given linear equation, or two given linear equations in the object article. That is, if the position and orientation of the object article are at random within a certain range, the approximate position of any predetermined partial shapes can also be known before the image processing, so that it is possible to detect the position and orientation of the whole object article from the combination of selected partial shapes to calculate the feature parameters such as the center of gravity, linear equations through image processing.

BRIEF DESCRIPTION OF THE DRAWINGS

FIGS. 8(a-b) is a flow chart of an exemplary position and orientation calculating process according to the present invention, in which (a) represents preparation of a dictionary, and (b) a recognition process;

FIG. 9 illustrates four fundamental patterns of feature shapes in this invention; and FIG. 10 illustrates combinations of feature of partial shapes to explain the method of this invention.

DESCRIPTION OF THE PREFERRED EMBODIMENTS

Figure 1:
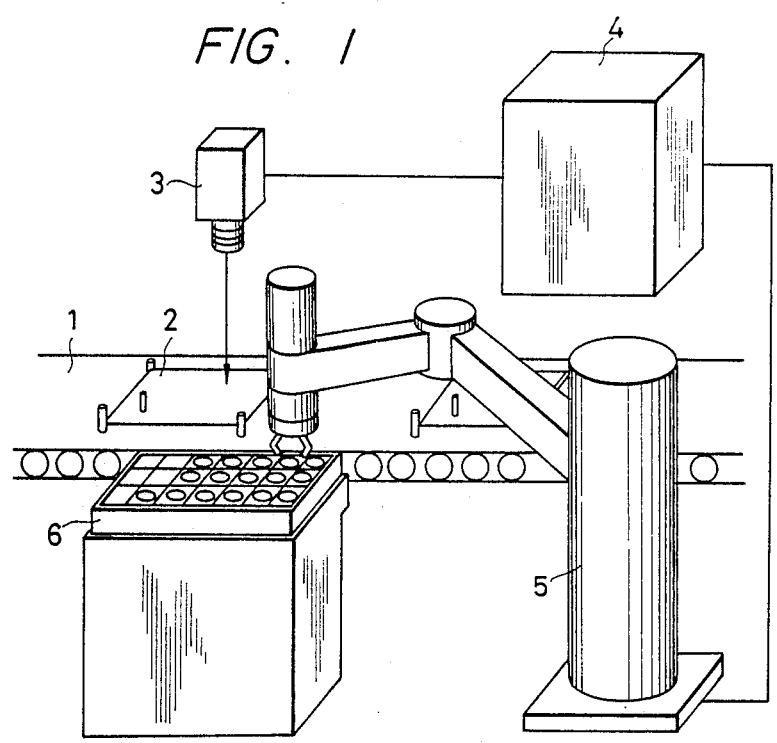
FIG. 1 shows a robotized automatic assembly system to which the present invention is applied.

First an explanation will be given on a robotized automatic assembly system to which the present invention is applicable. FIG. 1 shows an exemplary constitution of such a system. As illustrated, a chassis 2 transported on a belt conveyor 1 at random is picked up by a TV camera 3, and the entire or partial picture image of the chassis 2 is transmitted to an image processor 4, where the position and orientation of the chassis 2 are calculated from the input image and are fed to an assembly robot 5. Then the robot 5 takes out a part from a part supply magazine 6 and attaches it to the chassis 2 while correcting the position and orientation of the part to reference ones in conformity with the information received from the image processor 4. Generally the chassis 2 is placed in two-dimensional arbitrary position and orientation on the belt conveyor 1, and for enabling the robot 5 to perform exact attachment of each part to the chassis 2, the reference position and orientation data need to be corrected on the basis of the deviation of the chassis 2 computed from the input picture image.

Figure 2:
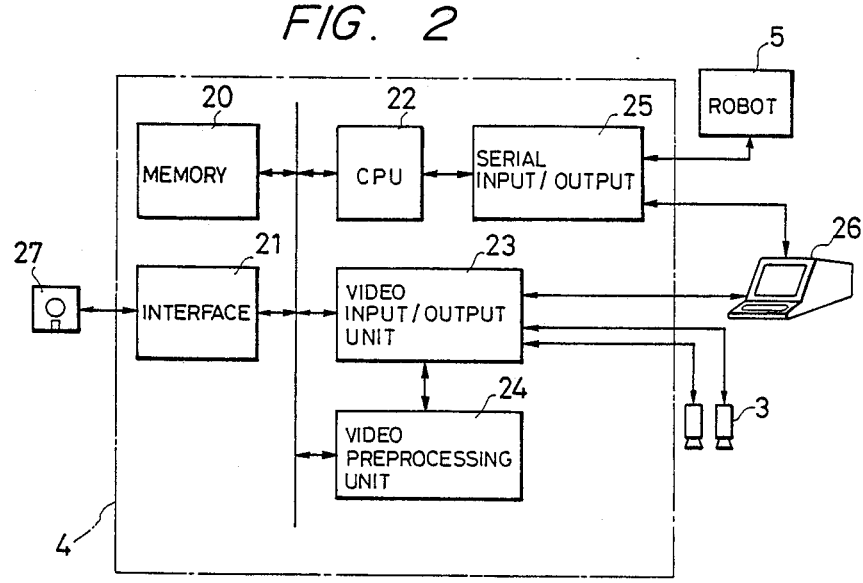
FIG. 2 is a block diagram showing a hardware constitution of an image processor in the system of FIG. 1.

The block diagram of FIG. 2 shows a hardware constitution of the image processor 4. The input picture image from the TV camera 3 is fed to a video input/output unit 23 and then is binary-coded for segmentation in a video processing unit, which thereby divides the image into black and white regions. The subsequent processing program is previously prepared on a floppy disk 27. The program thus prepared on the floppy disk 27 is stored in a memory 20 such as a magnetic bubble memory via a floppy disk interface 21, and also dictionary data is stored in the memory 20. Then the processing program and the dictionary data stored in the memory 20 are transferred to a memory on a central processing unit (CPU) in response to an instruction from the robot 5 and an instruction from a console 26 via s serial input/output interface 25, whereby the process is executed as shown in FIG. 8.

Figure 3:
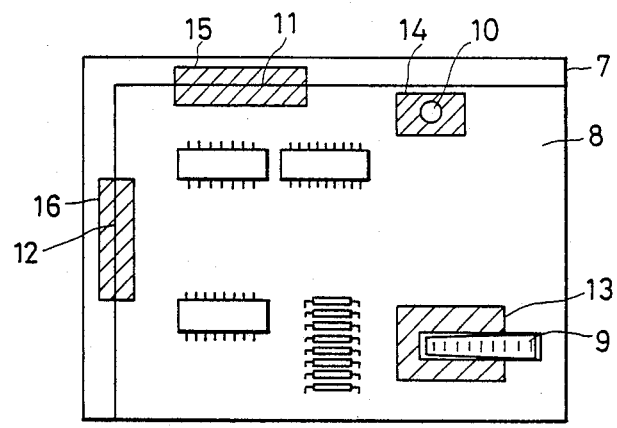
FIG. 3 illustrates how windows are set for partial shapes according to the present invention.

FIG. 3 shows some exemplary patterns of partial shapes. In the picture image 7 obtained from the TV camera 3, as illustrated, a portion of the substrate mounted on the chassis 2 is detected as an image 8 which includes a connector image 9, a hole image 10, substrate edge images 11, 12 and so forth to be extracted and processed as partial shapes. In case the position and orientation of the chassis 2 placed at random are not so much deviated from the reference position and orientation thereof, the partial shapes can be extracted out of the windows 13–16 preset in a suitable manner. Accordingly, the partial shapes thus extracted are classified into those representing the entire features such as hole image 10 and those representing the partial features such as connector image 9 and substrate edge images 11, 12.

Figure 4A:
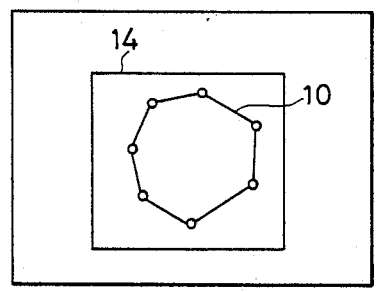
FIGS. 4 (a-b) illustrates exemplary polygonal approximations of partial shapes extracted through the windows, in which (a) shows a hole image and (b) a substrate edge image represented by a polygonal approximation, respectively.

FIGS. 4(a) and (b) illustrate exemplary partial shapes extracted. In the example (a), a hole image 10 representing an entire feature is segmented for polygonal approximation, wherein the coordinates of a sequence of points (marked with circles) are preserved as data. Meanwhile in the example (b), a substrate edge image 11 representing a partial feature and the frame of a window 15 are segmented for polygonal approximation and, with another window 18 set in the inner area except such frame of the window 15, merely the partial shape to be extracted is approximated to a sequence of segments, wherein the coordinates of a sequence of points (marked with circles) are preserved as data.

Figure 5:
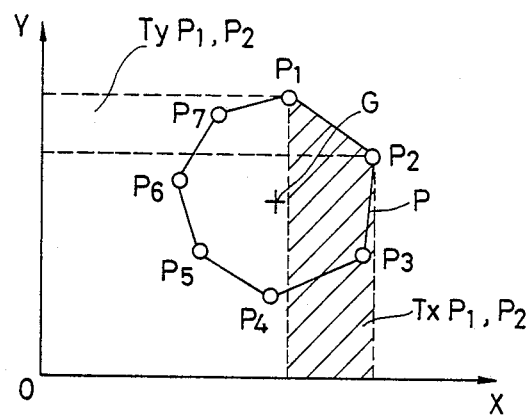
FIGS. 5 and 6 graphically show how a feature parameter is extracted from a segmented contour obtained in FIGS. 4(a) and (b), respectively.
Figure 6:
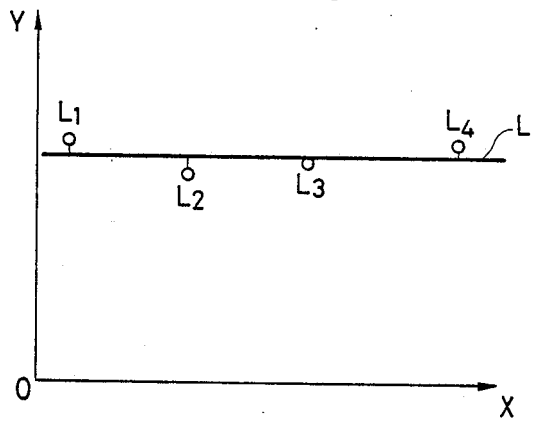

FIGS. 5 and 6 graphically show how a feature parameter is extracted from the segmented contour obtained in FIGS. 4(a) and (b), respectively. In the example where the entire feature shape can be extracted as shown in FIG. 4(a), the center of gravity (centroid) G is calculated. The x-coordinate xg and the y-coordinate yg of the center of gravity G are obtained as follows from the primary moments Mx, My and the area S of the whole polygon defined with a unitary trapezoid [TxP1, P2], [TyP1, P2] shown in FIG. 5 and a point sequence P={P1 (x1, y1), P2 (x2, y2), ..., P (x7, y7)} (where P8 (x8, y8) =P1 (x1, y1)):

$$Mx = \sum_{i=2}^{n+1} \frac{1}{6}(x_i + x_{i-1})(y_{i-1} + Y_i) \times \{y_{i-1} + y_i^2/(y_{i-1} + y_i)\} \quad (1)$$

$$My = \sum_{i=2}^{n+1} \frac{1}{6}(x_{i-1} + x_i)(y_{i-1} + y_i) \times \{x_{i-1} + x_i^2/(x_{i-1} + x_i)\} \quad (2)$$

$$S = \sum_{i=2}^{n+1} \frac{1}{2}(x_i - x_{i-1})(y_{i-1} + y_i) \quad (3)$$

$$Xg = My/S \quad (4)$$

$$Yg = Mx/S \quad (5)$$

where Mx and My relate to the x-axis and the y-axis, respectively.

Figure 4B:
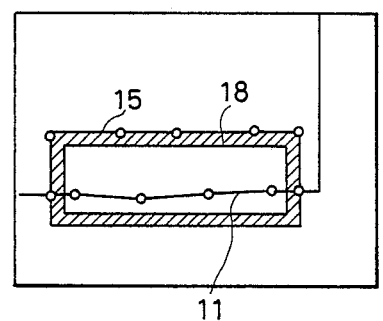

In another example of FIG. 4(b) showing a segment sequence which is plotted by excepting the frame portion of the window 18 and partially extracting the feature shape as in FIG. 6, the point sequence is approximated to a straight line by the method of least squares to calculate a linear equation y=ax+b (x=a'y+b'). In this case, the coefficients a and b are determined as follows with the point sequence L={L1 (x1, y1), L2 (x2, y2), ..., L4 (x4, y4)}.

$$P=(x^{-1}x)^{-1}x^T y \quad (6)$$

where $$x = \begin{pmatrix} x1 & 1 \\ \cdot & \cdot \\ \cdot & \cdot \\ \cdot & \cdot \\ x4 & 1 \end{pmatrix}, P = \begin{pmatrix} a \\ b \end{pmatrix}, y = \begin{pmatrix} y1 \\ \cdot \\ \cdot \\ \cdot \\ y \end{pmatrix}$$

and $x^{-1}$, $x^T$ are an inverse matrix and a transposed matrix of x, respectively.

Figure 7A:
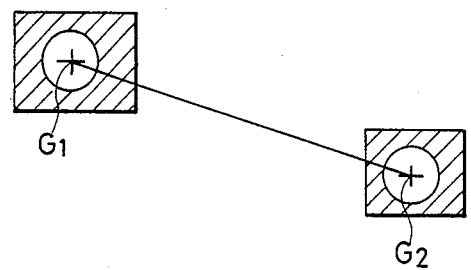
FIGS. 7(a) through (c) schematically illustrate the method of this invention for calculating a position and a orientation.
Figure 7B:
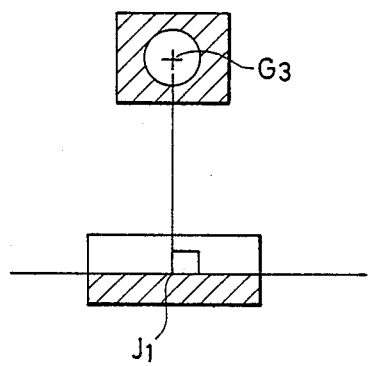
Figure 7C:
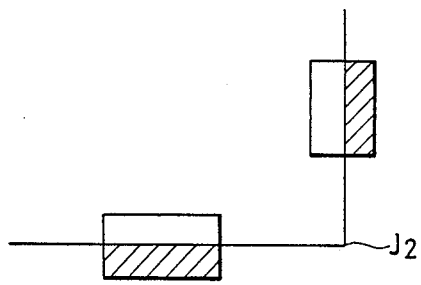

Referring now to FIGS. 7(a) through (c), a description will be given on the method of calculating the position and orientation on the basis of the feature parameters obtained in the manner mentioned. Since the feature parameters obtained are centers of gravity and straight lines, the combinations thereof include (a) center of gravity and center of gravity; (b) center of gravity and straight line; and (c) straight line and straight line. Hereinafter the method of calculating the position and orientation will be described with regard to the individual combinations. Generally, deviations from the reference position and orientation are in the x-direction, y-direction and rotational direction on the x-y plane.

In the example (a): the position of one partial shape and hence the positional deviations in the x- and y-directions can be calculated from the center of gravity G1 (x1g, y1g) relative to the feature-shaped portion, while the deviation angle θ in the rotational direction is calculated as follows from G1 (x1g, y1g) and G2 (x2g, y1g).

$$\theta=\tan^{-1}(y1-y2/x1-x2) \quad (7)$$

where G2 is the center of gravity relative to another feature-shaped portion.

In the example (b): the positional deviation is calculated from the center of gravity G3 (x3g, y3g) as in the foregoing example (a), and subsequently the deviation angle θ in the rotational direction is calculated as follows from the center of gravity G3 and an intersection J1 (x', y ) of a straight line (y=ax+b) and a perpendicular extending thereto from the center of gravity G3.

$$\theta=\tan^{-1}(y'=y3g/x'32\ x3g) \quad (8)$$

In the example (c): the position is calculated from an intersection J2 (x'', Y') of a straight line (y=ax+b) and another straight line ($y=ax+b$), and further the deviation angle $\theta$ in the rotational direction is calculated from the inclination a (or a″) of the straight line.

$$\theta = \tan^{-1} a \text{ or } \tan^{-1} a'' \tag{9}$$

FIG. 8 is a flow chart of an exemplary position and orientation calculating process executed by the method shown in FIGS. 7(a) through (c). According to this process, the position and orientation of input data are recognized by computing the deviation of the input data in comparison with reference data. The entire process is divided into (a) preparation of a dictionary serving as basic data, and (b) a recognition process for computing the deviation by comparison with the dictionary data.

Describing first (a) preparation of a dictionary which is an on-line process, a camera number and a stage number for preserving the data to convert the coordinates of a visual system and a robotic system are inputted from, for example, a console 26 [S1]. In the next step, a picture image based on the camera number and the stage number designated in S1 is inputted from the TV camera 3 [S2]. With regard to the input picture image illustrated in FIG. 3, for example, the coordinates of a right upper point and a left lower point in the square including feature shapes of FIGS. 4(a) and (b) are specified, and a window (e.g. 13 in FIG. 3) is set for defining a processing range and is registered [S31]. The contour of the feature shape within the registered window is extracted [S32] and then is classified by the extractable feature parameter [S33]. The feature parameter such as center of gravity or linear equation designated per classified feature shape is extracted and registered as a value relative to the registered window (13 in FIG. 13) [S34]. As mentioned above, the steps S31 through S34 are concerned with each of the windows [S3]. Such step S3 for each window is executed with respect to the entirely of the feature shapes required for position and orientation recognition on the picture image currently inputted. When using any feature shape on the other stage, the corresponding camera number and stage number are designated [S1] and, after the picture image is inputted [S2], the intrawindow process [S3] is executed. Subequent to extraction of the feature parameters by the above steps from all the feature shapes to be used, windows including the feature shapes to be combined are designated [S4], and dictionary data are registered in the memory 20 such as camera number, window size and position, feature parameter to be extracted, value of such parameter, windows to be combined and so forth [S5].

Describing in detail how to classify the feature shapes, the feature parameter to be calculated is basically represented by a linear equation which extracts, in the form of a straight line, the center of gravity obtained from the entire feature shape and a partial feature. However, in various feature shapes where the center of gravity is obtainable from the entirety thereof, there are some in which a secondary moment can be calculated to enable judgement of a position and an orientation by a single feature parameter. And in calculating a linear equation, there exists a case where two straight lines forming a hook in a special mode are obtained simultaneously. In such a case, the position and orientation can be calculated by two straight lines included in one partial shape, and the intersection of such two straight lines can be calculated immediately. In calculating the position and orientation, the intersection is of great importance as well as the center of gravity. FIG. 9 illustrates four patterns of feature shapes classified by taking into consideration the case where special feature parameters can be obtained, such as center of gravity plus secondary moment, and two straight lines plus intersection. According to this classification, feature shapes are assorted into: (1) a pattern where merely a center of gravity can be calculated from the entire feature shape; (2) a pattern where a center of gravity and a secondary moment can be calculated from the calculated from the entire feature shape; (3) a pattern where one straight line can be calculated; and (4) a pattern where two nonparallel straight lines or such two lines and an intersection thereof can be calculated. In the last pattern, high-precision judgment is achievable if the two straight lines are sufficiently long, but stability is not ensured when the lines are short, so that a sole judgment is not approvable.

Now the recognition process executed with connection of the robot 5 will be described below with reference to FIG. 8(b).

First the image processor 4 is actuated by the robot 5 to execute operating instructions [S6]. The designated camera number and stage number are image-inputted into the image processor 4 in response to such instructions [S7]. Then the window registered at the time of preparing the dictionary is set with regard to the window including feature shapes to be used, and subsequently extraction of the intrawindow features shapes [S81] and extraction of the feature parameters [S82] are executed in the same manner as at the time of preparing the dictionary. Further in the recognition process, the extracted data is checked whether it is the object pattern or not on the basis of the area value and so forth, and the extracted data is registered as recognition data in case the result of such check is OK [S84]. If the result is not OK, the process advances to the step for the next window. When there are any feature shapes to be used on another image plane, the images thereof are inputted so that the feature parameters are extracted with respect to all the feature shapes [S8]. Whenever the windows are combined [S9] in accordance with the dictionary data, the deviation or difference from the dictionary data is computed by the method mentioned with reference to FIGS. 7(a)–(c) [S10]. And finally the deviation obtained in the preceding step is converted into a robotic coordinate system and the resultant value is transmitted to the robot 5, or the deviation is checked to ascertain whether it is within the allowable range or not and then the result is transmitted to the robot 5 [S11].

Finally the position and orientation calculating method based on a combination of feature parameters will be described below with reference to FIG. 10, which shows how a position and an orientation are calculated by a combination of the feature shapes illustrated in FIG. 8. Any combination is possible among all of the four patterns. For example, in a combination where two intersections of two straight lines are obtained, the position and orientation can be calculated in the same manner as in a combination where two centers of gravity are obtained. In other cases also, the position and orientation of the whole object article can be calculated on the basis of two partial feature shapes.

As mentioned hereinabove, viewing the fact that the positional correlation between partial shapes of a whole object article is previously fixed, the present invention is so contrived as to perform proper recognition of the position and orientation of the whole object article from one or more partial shapes thereof. Accordingly, if the object article is dimensionally large or its image is complicated, remarkable effect is still achievable in properly recognizing the position and orientation of the whole object article.

What is claimed is:

1. A position and orientation calculating method comprising the steps of:
   inputting a two-dimensional picture image of an object article obtained from an image detector;
   extracting at least two two-dimensional images from at least two windows defining image processing ranges corresponding to two portions of the object article in accordance with coordinates of each of said two windows, and extracting data describing coordinates of a sequence of points from a sequence of segments approximated as a polygon for an image designating a contour of a portion of the object article between each of said two windows;
   calculating a center of gravity from said data with respect to a pattern adapted for extraction of an entirety of a partial shape from said two two-dimensional images and calculating a straight line by a linear equation from said data with respect to the pattern adapted for extraction of the partial shape from said windows; and
   calculating calculated data describing position and orientation of the object article from said center of gravity and calculating the orientation of said object article from a combination of said center of gravity and the intersection of said straight line and a perpendicular line extending thereto from said center of gravity.

2. A position and orientation calculating method according to claim 1, wherein the actual position and orientation are defined by computing differences between said calculated data and reference dictionary data.

3. A position and orientation calculating method comprising the steps of:
   inputting a two-dimensional picture image of an object article obtained from an image detector;
   extracting at least two two-dimensional picture images from at least two windows defining image processing ranges corresponding to two portions of the object article in accordance with coordinates of each of said two windows, and extracting data describing coordinates of a sequence of points from a sequence of segments approximated as a polygon for an image designating a contour of a portion of the object article between each of said windows;
   calculating at least two centers of gravity from said data with respect to a pattern adapted for extraction of entire partial shapes by each of said windows; and
   calculating as calculated data describing the position of said object article from one of said centers of gravity and the orientation of said object article from said two centers of gravity.

4. The method as defined in claim 3, wherein the actual position and orientation are defined by computing differences between said calculated data and reference dictionary data.

5. A position and orientation calculating method comprising the steps of:
   including a two-dimensional picture image of an object article obtained from an image detector;
   extracting at least two two-dimensional picture images from at least two windows defining image processing ranges corresponding to portioins of the object article in accordance with the coordinates of each said two windows, and extracting data describing coordinates of a sequence of points in a sequence of segments approximated as a polygon for an image designating a contour of a portion of the object article between each of said windows;
   calculating at least two straight lines by a linear equation from said data with respect to patterns adapted for extraction of partial shapes from said windows; and
   calculating as calculated data describing the position of said object article from the intersection of said two straight lines and orientation of said object article from the inclination of one of said straight lines.

6. The method as defined in claim 5, wherein the actual position and orientation are defined by computing differences between said calculated data and reference dictionary data.

7. The method as defined in claim 6, wherein the position and orientation of said object article are calculated according to an arbitrary combination of said four patterns.

8. A position and orientation calculating apparatus, comprising:
   an image detector for inputting a two-dimensional picture image of an object article;
   an image processor including:
   extracting means for extracting at least two twodimensional picture images from at least two windows defining image processing ranges corresponding to poritons of the object article in accordance with coordinates for each of said two windows, and for extracting extractable data describing coordinates for a sequence of points from a sequence of segments approximating a polygon for an image designating the contour of portions of the object article between each of said windows, and
   calculating means for calculating information describing a center of gravity from said extractable data with respect to a pattern adapted for extraction of an entirety of a partial shape from said two images provided by said windows and calculating a straight line by a linear equation from said extractable data with respect to a pattern adapted for extraction of the partial shape by said windows, and calculating information describing a position of said object article from said center of gravity and said information describing the position and orientation of said object article from a combination of said center of gravity and the intersection of said straight line and a perpendicular line extending thereto from said center of gravity; and
   correcting means for providing corrected data by correcting the difference between position and orientation calculated and reference dictionary data defining said coordinates of each of said two windows on the basis of the calculation position and orientation information.

9. The apparatus as defined in claim 8, wherein the apparatus is adapted for controlling a robot for moving the object article in accordance with corrected data provided by said correcting means.

* * * * *